J. C. HOLSTON.
Coffee Roaster.

No. 34,923.

Patented April 8, 1862.

UNITED STATES PATENT OFFICE.

JOHN C. HOLSTON, OF DERRY, NEW HAMPSHIRE, ASSIGNOR TO SAMUEL M. DAVIS, OF LAWRENCE, MASSACHUSETTS.

IMPROVEMENT IN COFFEE-ROASTERS.

Specification forming part of Letters Patent No. 34,923, dated April 8, 1862.

*To all whom it may concern:*

Be it known that I, JOHN C. HOLSTON, of Derry, in the county of Rockingham and State of New Hampshire, have invented new and useful Improvements in Corn-Poppers or Coffee-Roasters; and I do hereby declare that the following is a full and exact description thereof, reference being had to the accompanying drawings, and to the letters of reference marked thereon.

Figure 1:
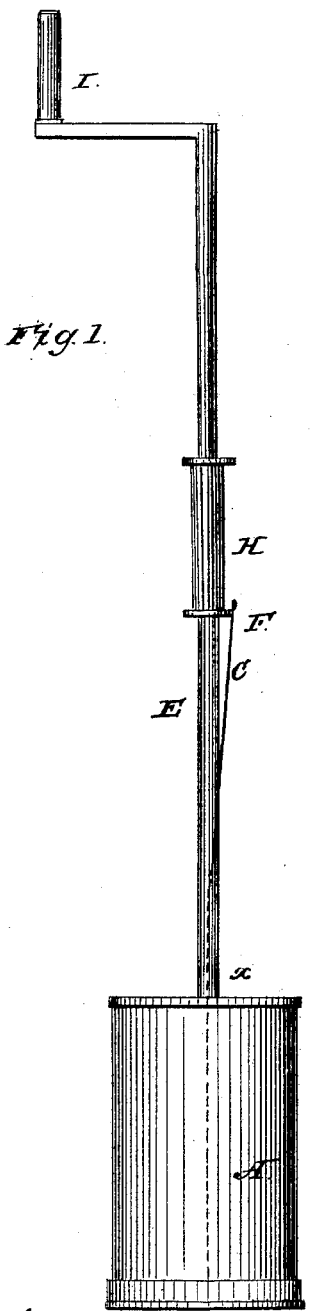
Figure 2:
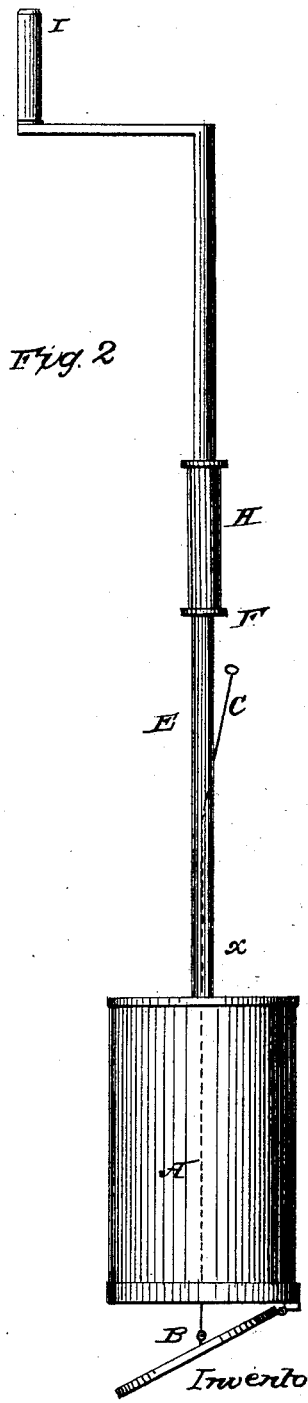

Figure 1 represents a side view of popper or roaster as shut. Fig. 2 represents a side view of popper or roaster as open.

A represents a wire-gauze cylinder in which is placed the corn to pop or the coffee to roast.

B represents the door in the hollow cylinder, which is opened or shut by the wire C, which passes through the hollow tube E, and is attached to the small plate F when the door of the cylinder is shut.

H is a tube or handle made to move easily around tube E.

I is the handle of a common crank.

Now, when the corn or coffee is put in the cylinder A through the door B and the door is shut, as in Fig. 1, then with one hand at the handle H and the other at the handle of the crank I, the tube E resting on the stove or oven door, as at X, by turning the crank the corn or coffee will be moved around gently in the inside of the cylinder, and thus be kept from burning until the corn is popped or the coffee is roasted, and it can be done well and with perfect ease. When done, the wire is slipped from the plate F, and the parched corn or roasted coffee is poured out through the door B, which is opened by the wire, as in Fig. 2. The object of the long wire is to enable any one using the popper to open the door of the cylinder when it is hot. The wire is moved in the tube E, so as not to interfere with the revolving of the cylinder A when resting at the point X.

I claim—

The combination of the hinged door B, the wire C, passing through the hollow tube E, and used to open and close the door B, and the catch F, with a corn-popper or coffee-roaster, when constructed substantially as described, and for the purposes set forth.

JOHN C. HOLSTON. [L. S.]

Witnesses:
LEONARD BRICKETT,
BENJAMIN R. SARGENT.